Feb. 2, 1932.    H. R. RAFTON    1,843,242
STRAINER SYSTEM
Filed April 8, 1929    2 Sheets-Sheet 1
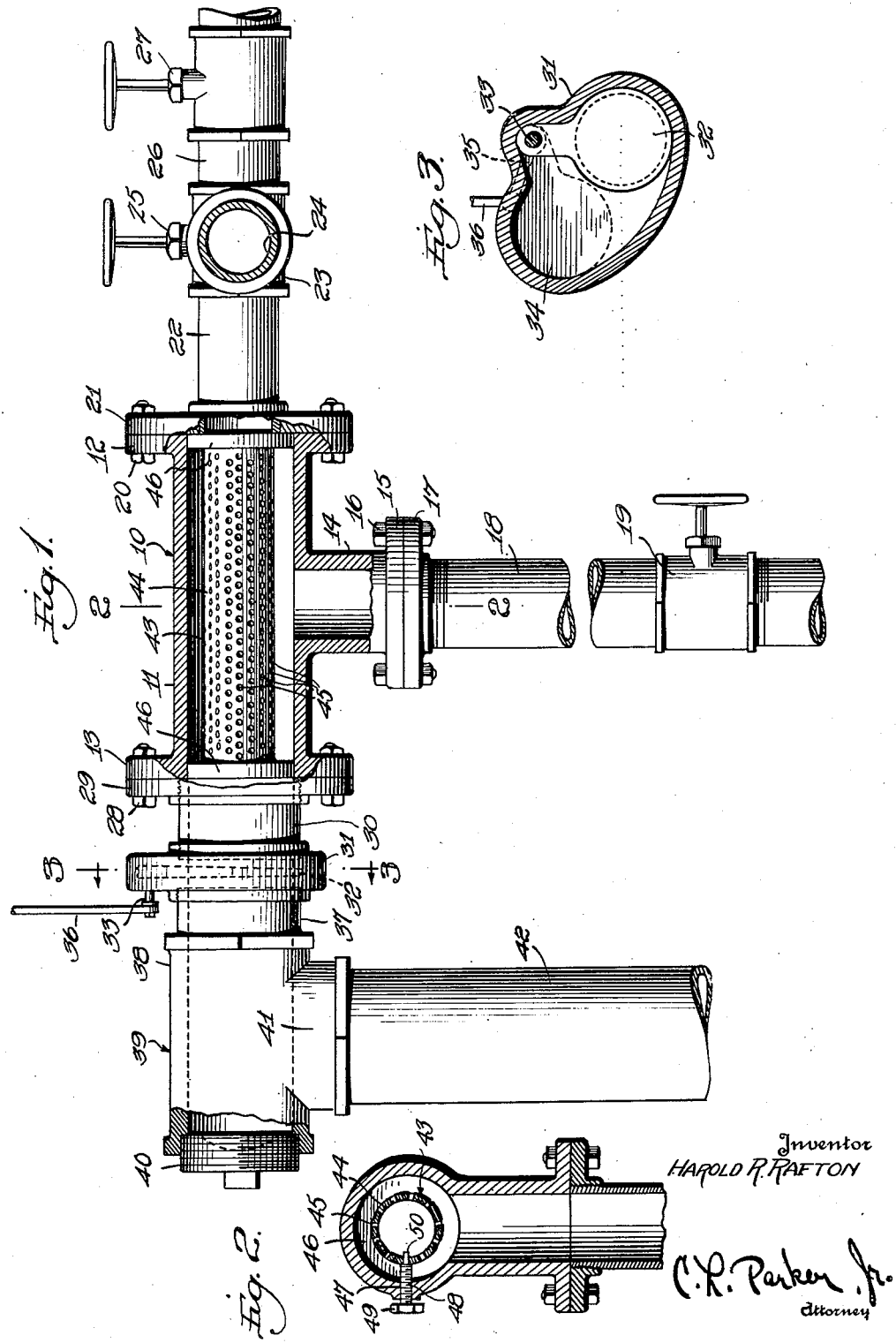

Feb. 2, 1932. H. R. RAFTON 1,843,242
STRAINER SYSTEM
Filed April 8, 1929  2 Sheets-Sheet 2

Inventor
HAROLD R. RAFTON
By C. L. Parker Jr.
Attorney

Patented Feb. 2, 1932

1,843,242

UNITED STATES PATENT OFFICE

HAROLD ROBERT RAFTON, OF LAWRENCE, MASSACHUSETTS, ASSIGNOR TO RAFTON ENGINEERING CORPORATION, A CORPORATION OF MASSACHUSETTS

STRAINER SYSTEM

Application filed April 8, 1929. Serial No. 353,512.

This invention relates to strainer systems, and more particularly to a strainer and associated elements intended for use in connection with the manufacture of paper pigments, while not restricted to such use.

In the manufacture of paper pigments, particularly where lime is employed, the slurries contain solid particles some of which are from one-eight to one inch or more in diameter and which would interfere with the operation of the pumping apparatus through which the slurries pass, if such particles were not strained out of the slurries. The present invention has for its principal object the provision of a strainer system which is particularly adapted for use in connection with handling the slurries of paper pigments to permit the separation of relatively large solid particles from the slurries so that the latter may be passed to the pumping mechanism without interfering with the operation thereof.

A further object is to provide a system of the character referred to employing a strainer element which is adapted to be flushed substantially clean without necessitating the removal of the strainer element from the system.

A further object is to provide a system of the character referred to wherein the strainer element may be quickly and readily removed from the system to permit thorough cleaning thereof when necessary.

A further object is to provide a novel strainer element and mounting means therefor whereby the system is adapted for continuous and effective operation for the removal of solid particles from the material passing therethrough, and wherein the mounting means is of such character as to permit the ready removal of the strainer element.

A further object is to provide a novel strainer element and mounting means therefor whereby the strainer element may be quickly and conveniently removed without the detachment or removal from position of any of the associated piping.

A further object is to provide a strainer system and associated piping and valve connections therefor whereby the transmission of the slurries to be strained may be cut off and water or other liquid supplied to the strainer element to flush the latter.

A further object is to provide a strainer system in which all parts with the exception of the strainer element may be constructed of standard pipe and fittings.

Other objects and advantages of the invention will become apparent during the course of the following description.

Figure 4:
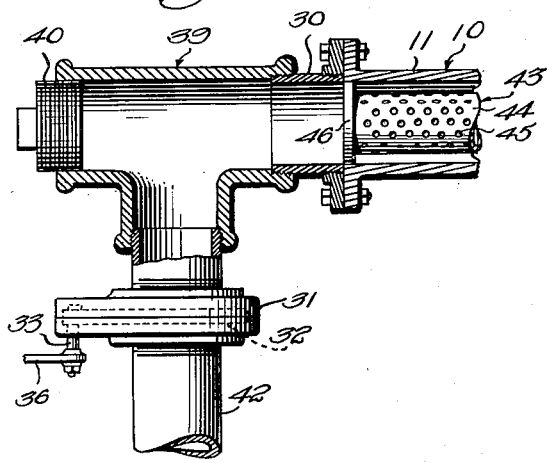
Figure 5:
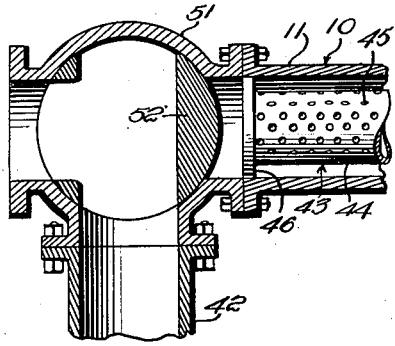
Figure 6:
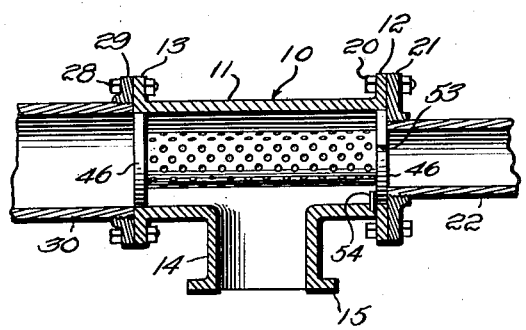
Figure 7:
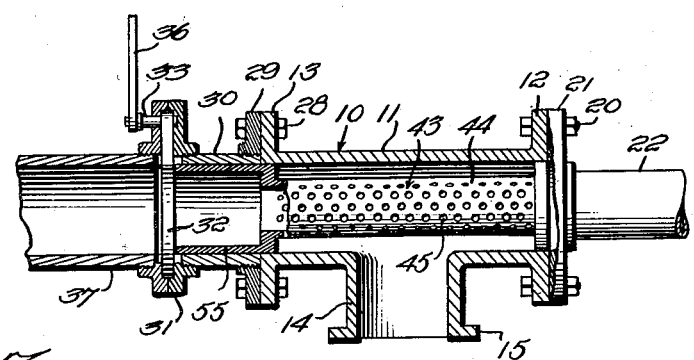

In the drawings I have shown several embodiments of the invention. In this showing, Figure 1 is a side elevation, parts being broken away and parts being shown in section, Figure 2 is a section on line 2—2 of Figure 1, Figure 3 is a similar view on line 3—3 of Figure 1, Figure 4 is a fragmentary sectional view of a modified flushing valve mounting, parts being shown in elevation, Figure 5 is a similar view showing a different type of flushing valve, Figure 6 is a similar view illustrating a modified form of strainer retaining means, and Figure 7 is a similar view showing a further modified form of strainer retaining means.

Referring to Figures 1 and 2, the numeral 10 designates a T, the run 11 of which is preferably horizontally arranged and preferably of circular cross section and which is preferably of uniform internal diameter throughout its length. The ends of the T are flanged as at 12 and 13 for connection with piping means to be described. The branch 14 of the T is arranged substantially centrally thereof and is flanged at its ends as at 15 whereby it is adapted to be bolted as at 16 to a flange 17 connected to the end of an outlet pipe 18. This pipe is connected to the usual pumping mechanism, and the flow of material through the pipe is adapted to be controlled by a valve 19.

The flange 12 is bolted as at 20 to a flange 21 of an inlet pipe 22, the opposite end of which is connected to the run of a T 23. The branch of the T 23 is connected to a pipe 24, leading from a source of water supply, and a valve 25 is adapted to control the flow of water from the source to the pipe 22.

The other end of the run of the T 23 is connected to a pipe 26, the opposite end of which leads from a source of supply of the slurries to be strained and passed to the pumping mechanism. Passage of the slurries through the pipe 26 is controlled by a valve 27.

The flange 13 is adapted to be bolted as at 28 to the flange 29 of a pipe section 30, the opposite end of which is connected to a valve housing 31, preferably of the "straight through" type, as shown in Figures 1 and 3. The openings through the pipe 30 and valve casing 31 are at least equal in diameter to the internal diameter of the run of the T 11, for a purpose to be described. A quick opening valve 32 is mounted in the casing 31 and is connected to a shaft 33, which is adapted to be turned to swing the valve 32 into an offset pocket 34 formed in the casing 31. The pocket 34 is of such size as to adapt it to receive the entire body of the valve to render the opening through the valve casing wholly unobstructed. The shaft 33 may be provided with a crank 35 having an operating rod 36 pivotally connected to its free end. The valve described is particularly adapted for use in connection with the present system, but the invention is in no way limited to the use of any specific form of valve, as will become apparent.

The outlet side of the valve casing 31 is connected by a pipe section 37 to one end of the run 38 of a T 39. The opposite end of this T is normally closed by a preferably screw threaded plug 40, although of course, as an alternative arrangement, for instance, another valve similar to the valve 31 could be attached to the outer end of the T 39. The internal diameter of the run of the T 39 also is at least equal to that of the run of the T 10. The branch 41 of the T 39 communicates with an outlet pipe 42.

The run of the T 10 is adapted to contain a strainer illustrated as a whole by the numeral 43. This strainer is preferably substantially in the form of a spool having a preferably cylindrical foraminous body 44 preferably perforated as at 45. The ends of the strainer are provided with annular external flanges 46 which substantially fit within the run 11 of the T 10. The run of the T 10 is provided with a threaded opening 47 in which is mounted a set screw 48. This screw is provided with a polygonal head 49 at its outer end, while its inner end is provided with a reduced tapered extension 50 adapted to be arranged in one of the perforations of the strainer. Obviously the extension 50 is adapted to prevent movement of the strainer when the parts are assembled in the manner shown.

A somewhat modified form of mounting of the valve 31 is illustrated in Figure 4 of the drawing, in which the valve referred to is arranged in the pipe 42 instead of between the Ts 11 and 39. This arrangement is optional and possesses the advantage of rendering the removal of the strainer somewhat more easily accomplished.

Instead of the gate valve 31, a rotating three-way valve may be employed, and one embodiment of such a valve is illustrated in Figure 5. In this embodiment, a three-way valve body 51 is substituted for the T 39. A three-way valve 52 is rotatable in the body 51, and the ports in the valve and body are at least equal in diameter to the internal diameter of the run of the T 11.

In Figure 6 of the drawings a modified form of strainer retaining means is shown. The flange 46 at the right hand end of the strainer 43 is transversely slotted as at 53, and this slot is slidable over a pin 54 secured in the T 11. The pin is arranged at a distance from the corresponding end of the T 11 substantially equal to the thickness of the flange 46, while the length of the pin and the depth of the associated slot are preferably less than the radial width of the flange 46. The strainer is inserted into position with the pin and slot in alinement with each other and is moved into operative position, whereupon the pin will clear the slot and the strainer may be rotated. Longitudinal movement of the strainer then will be prevented.

The valve element 32 may be utilized, if desired, as the means for retaining the strainer element in position, as suggested in Figure 7. As shown, the strainer may be provided with a concentric longitudinal extension 55 which contacts with the valve 32. Except when the latter is in fully open position, it serves to prevent longitudinal movement of the strainer element.

The operation of the form of the system illustrated in Figure 1, 2 and 3 is as follows:

The valves 19 and 27 are opened, while the valves 25 and 32 are closed. The slurries to be strained are thus permitted to flow from the source to the inlet end of the strainer through the pipes 26 and 22, the inner end of the latter seating substantially against the inlet end of the strainer as shown in Figure 1. The flange 21 serves as a stop against which one end of strainer 43 substantially abuts and which serves to center the strainer 43 in the T 10. The inside diameter of the pipe 22 is preferably the same as the inside diameter of the strainer. The liquid and fine particles of the slurry flow into the strainer and thence outwardly through the perforations 45. It will be noted that a relatively large annular space is provided in the run of the T 10 around the strainer, and thus a free flow of the liquids and fine materials is permitted. The strained material passes through the branch 14 and the piping connections 18 to the pumping mechanism, while the coarse material is retained within the strainer.

When the strainer becomes clogged with coarse material so as to interfere with its proper operation, the valves 19 and 27 are closed and the valves 25 and 32 are opened. Thus the supply of material is cut off, and communication is also cut off between the T 10 and the pumping mechanism. With the valves arranged as stated, water will be admitted into the strainer through the pipe 24 and associated connections, and thus water will flow through the strainer to carry the coarse material therein through the pipe 30, valve casing 31, and pipe 37, and thence into the T 39 from which it is carried off through the outlet pipe 42. The valves 25 and 32 are then closed, and the valves 19 and 27 are opened, whereupon the normal operation of the system is resumed.

From the foregoing it will be apparent that the normal clogging of the strainer may be overcome by flushing it with water or similar fluid—in which term I mean to include the use of a gas, preferably compressed air—but under some conditions, the perforations 45 of the strainer become clogged such as for instance with wood chips or fiber from bagging or by lodgment of grit particles, and this is particularly true after the system has been in operation for a length of time. Under such conditions, the strainer is adapted to be wholly removed from the system to permit it to be thoroughly cleaned without disturbing the associated piping. As previously stated, the internal diameters of the pipes 30 and 37, the opening of the valve casing 31 and the run of the T 39 are at least equal to the internal diameter of the run of T 10. Accordingly when it is desired to remove the strainer, the valve 27 may be closed and the valve 32 opened, and the screw 48 withdrawn, whereupon the plug 40 may be removed. A hooked rod then may be inserted through the T 39 and associated elements and engaged in one of the openings of the strainer, whereupon the latter is adapted to be removed for cleaning purposes.

After the strainer has been cleaned, it may be replaced in the run of the T 10, whereupon the set screw 48 may be tightened and the plug 40 replaced. Upon the closing of the valve 32 and the opening of the valve 27, the normal operation of the system will then be resumed.

The operation of the form of the system shown in Figure 4 is identical with that previously described. This form of the device shortens the distance through which the strainer slides to effect its removal for cleaning purposes since the Ts 10 and 39 are arranged close to each other.

In the form of the device illustrated in Figure 5, the valve is normally arranged as shown. For flushing the strainer element the valve is rotated through 180° to bring the branch valve port into communication with the T 10. When it is desired to remove the strainer, the through port of the valve is horizontally arranged, whereupon the strainer may be withdrawn through the valve and the outer port of the valve body.

The device illustrated in Figure 6 is merely an optional means of retaining the strainer element in position, and the method of inserting the strainer element has been previously referred to. The strainer readily may be removed by rotating it until the pin 54 and slot 53 are in alinement with each other, whereupon the strainer may be withdrawn longitudinally in the manner described.

In the form of the device shown in Figure 7, the extension 55 contacts with the valve 32 except when the latter is in fully open position. Thus the valve may be opened sufficiently to flush the strainer element without permitting dislodgement of the strainer element, while the latter may be removed in the manner described by moving the valve 32 to fully open position as shown in dotted lines in Figure 3.

From the foregoing it will be apparent that novel means is provided for straining materials of the character referred to, and that the straining element is adapted to be cleaned under normal conditions without removing it from the system. It also will be apparent that when conditions so require, the straining element may be quickly and readily removed and cleaned without detaching or removing from position any of the associated piping and then replaced to permit the operation of the system to be resumed.

It is of course apparent that means other than screw 48 can be used to secure strainer 43. For example one end of the run 11 of T 10 may be provided with an interior female screw thread, adapted to engage a male screw thread on the outer edge of one of the annular external flanges 46. The strainer may then be secured by rotating it in the T 10, and released by rotating it in the reverse direction.

It is to be understood that the forms of the invention herewith shown and described are to be taken as preferred examples of the same and that various changes in the shape, size, and arrangement of parts may be resorted to without departing from the spirit of the invention or the scope of the subjoined claims.

I claim:

1. A strainer system comprising a casing, a strainer element mounted in said casing, piping connected at one end to said casing and at its opposite end to a source of material to be strained, a valve controlling said piping, means for supplying a flushing fluid to said piping between said valve and said casing, a control valve for said means, piping connected to said casing for withdrawing strained material therefrom, a connection for said casing through which said strainer element is adapted to be withdrawn, means normally closing the outer end of said connection, a valve for said connection, and a outlet pipe communicating with said connection between said last named valve and the closure means for said connection.

2. A strainer system comprising a casing having inlet and outlet connections for causing a flow of material through said casing, a valve controlling each of said connections, a strainer element mounted in said casing and through which material is adapted to flow, means for supplying a flushing fluid to said inlet connection between the valve thereof and said casing, an outlet connection for said casing through which flushing fluid is adapted to flow from said casing and through the outer end of which said strainer element is adapted to be withdrawn, a closure member for the outer end of said outlet connection, an outlet pipe communicating with said outlet connection, and a valve for said outlet connection between said casing and said outlet pipe.

3. A strainer system comprising a casing having inlet and outlet connections for causing a flow of material through said casing, a valve controlling each of said connections, a strainer element mounted in said casing and through which material is adapted to flow, means for supplying a flushing fluid to said inlet connection between the valve thereof and said casing, an outlet connection for said casing through which flushing fluid is adapted to flow from said casing and through the outer end of which said strainer element is adapted to be withdrawn, a closure member for the outer end of said outlet connection, an outlet pipe communicating with said outlet connection, a valve for said outlet connection between said casing and said outlet pipe, and means carried by said casing for normally holding said strainer element in position therein and releasable from said strainer element.

4. A strainer system comprising a casing, a strainer element mounted in said casing and provided with perforated portions spaced from the walls thereof, a supply pipe for supplying material to be strained to the interior of said strainer element, a take-off pipe connected to said casing for draining strained material therefrom, valves controlling said pipes, means for supplying a flushing fluid to said supply pipe between the valve thereof and said strainer element, a valve for controlling the flow of fluid through said means, an outlet connection arranged in alinement with said casing and communicating with the interior of said strainer element, a plug normally closing said outlet connection and removable to permit withdrawal of said strainer element therethrough, a valve arranged in said outlet connection, and an outlet pipe communicating with said outlet connection.

5. A strainer system comprising a casing, an elongated hollow strainer element mounted in said casing and provided with perforated portions spaced from the walls thereof, means carried by said casing for retaining said strainer element in position therein and releasable from said strainer element, a pipe for supplying material to the interior of said strainer element at one end thereof, a take-off pipe connected to said casing for draining strained material therefrom, valves controlling said pipes, valve controlled means for supplying a flushing fluid to said supply pipe between the valve thereof and said strainer element, an outlet connection communicating with the interior of said strainer element at the opposite end thereof, a closure for said outlet connection adapted to be removed to permit withdrawal of said strainer element through said outlet connection, and a valve controlling said outlet connection.

6. A strainer system comprising a T, a strainer element arranged in the run of the T, a pipe for supplying material to be strained to the interior of the strainer element at one end thereof, a take-off pipe connected to the branch of said T, valves controlling said pipes, an outlet connection connected to the run of the T and communicating with the opposite end of said strainer element, a closure member for said outlet connection adapted to be removed to permit withdrawal of said strainer element through said outlet connection, means for normally holding said strainer element in position in the run of said T and releasable from said strainer element, and a valve controlling said outlet connection.

7. A strainer system comprising a T, a strainer element arranged in the run of the T, said element having a reduced cylindrical perforated intermediate portion and annular external flanges at its ends substantially fitting in the run of the T, a pipe connected to one end of the run of the T for supplying material to be strained to the interior of said strainer element, a take-off connected to the branch of said T, a valve controlling each of said pipes, an outlet connection connected to the opposite end of the run of the T in alinement therewith and communicating with the interior of said strainer element, the internal diameter of said outlet connection being at least equal to that of the run of the T, a closure for the outer end of said outlet connection adapted to be removed to permit withdrawal of said strainer element through said outlet connection, a valve controlling said outlet connection, and valve controlled means for supplying a flushing fluid to said supply pipe between the valve thereof and said strainer element.

8. A strainer comprising a hollow cylindrical body having an outlet branch intermediate its ends, a cylindrical perforated strainer element arranged in said body and spaced from the walls thereof, said strainer element being provided at its ends with external annular flanges substantially fitting within said body, a threaded screw carried by said body and having its inner end adapted to engage within one of the perforations of said strainer element to retain the latter in position, a valved outlet connection for one end of said body having an internal diameter at least equal to that of said body, a plug for the outer end of said connection removable to permit withdrawal of said strainer element through said connection, a take off pipe communicating with said outlet connection intermediate the ends thereof, and means connected to the opposite end of said body for supplying material to be strained to the interior of said strainer element.

9. A strainer system comprising a casing, a strainer element mounted in said casing, piping connected at one end to said casing and at its opposite end to a source of material to be strained, a valve controlling said piping, means for supplying a flushing fluid to said piping between said valve and said casing, a control valve for said means, piping connected to said casing for withdrawing strained material therefrom, a connection for said casing through which said strainer element is adapted to be withdrawn, an outlet pipe communicating with said connection, and means operative for opening and closing said connection to permit said strainer element to be withdrawn through said connection and for establishing communication between said casing and said outlet pipe.

In testimony whereof I affix my signature.

HAROLD ROBERT RAFTON.